United States Patent Office 3,540,898
Patented Nov. 17, 1970

3,540,898
CREEP RESISTANT PERICLASE REFRACTORIES
James R. Kreglo, Jr., Bethlehem, Pa., assignor to Bethlehem Steel Corporation, a corporation of Delaware
No Drawing. Filed Oct. 31, 1967, Ser. No. 679,540
Int. Cl. C04b 35/04
U.S. Cl. 106—58                            2 Claims

ABSTRACT OF THE DISCLOSURE

A high purity magnesite basic refractory shape having improved resistance to creep and having good cold and hot strength made from a basic refractory graded mix of high purity magnesite containing not less than 90% magnesia by weight to which is added a 50% titanium oxide-50% manganese oxide mix in an amount to obtain from about 0.5% to about 5.0% titanium oxide by weight and from about 0.5% to about 5.0% manganese oxide by weight in the basic refractory mix. The titanium oxide and manganese oxide grains are of a size that substantially all will pass a 325 mesh Tyler Sieve size, and the shape is fired at not less than 2800° F.

BACKGROUND OF THE INVENTION

Basic refractory shapes of the high purity magnesite type fail at the high temperatures prevailing in metallurgical refining vessels. Failure is generally attributed to thermal shock, expansion and subsidence and to attack by ferruginous slags and the gaseous environment prevailing in the vessels. Prior art practices to improve the service life of the basic refractory shapes have been directed to overcoming the above problems and included impregnating or bonding the grains with a carbonaceous material to prevent deterioration by hydration and attack by ferruginous slags and gaseous elements and the addition of refractory oxides, mica and fluxes to the refractory mix prior to fabrication into shapes to increase the refractoriness of the shapes. Additions of these refractory oxides have a detrimental effect on the physical properties of the shapes at room temperature. The shapes become brittle and are difficult to handle. However the susceptibility of the shapes to failure by creep has not been generally recognized. Therefore, no attempt to increase the resistance of the shapes to creep has been made.

It is therefore the object of this invention to provide a basic refractory shape of the high purity magnesite type which has improved resistance to creep at moderate temperatures, good hot strength and good strength at room temperature.

SUMMARY OF THE INVENTION

Broadly, the invention comprises a basic refractory shape made from a high purity magnesia basic refractory graded mix to which a mix of at least two refractory oxides is added to improve the resistance of the shape to creep. The shape is formed and fired in a conventional manner to obtain the necessary refractoriness.

The present invention is directed to high purity magnesia basic refractory shapes having good stability when used as a structural unit in metallurgical furnaces and when subjected to thermal gradients under load, the structural load being transferred away from the hot faces of the shapes as the faces become pyroplastic because of heat, slag and compositional changes, toward the structurally stable portion of the shapes. The greater structural stability of the refractory shapes is due to additions of refractory oxides to control the tendency of the shapes to creep. Creep is defined as the flow or movement of materials at moderate temperatures while under stresses which are lower than normal yield strength. Studies of single and polycrystalline magnesia particles show that the deformation of high purity magnesite refractory shapes at elevated temperatures under a constant load is caused by the diffusion of atoms along grain boundaries, dislocation movements within the grains and grain boundary sliding.

It has been found that the tendency to creep of high purity magnesite basic refractory shapes which contain a high percentage of magnesia for example about 86% may be substantially retarded if not completely halted by small but significant additions of refractory oxides to the shapes. Refractory oxides for example titanium oxide, aluminum oxide, manganese oxide, calcium oxide and zirconium oxide in the proportions hereinafter specified may be added to the basic refractory graded mix prior to processing the shapes therefrom to inhibit the creep rate of these shapes.

The invention is particularly adapted to increasing the resistance to creep of high purity magnesite basic refractory shapes made from a basic refractory graded mix containing not less than 90% magnesia and preferably not less than 94% magnesia. The basic refractory high purity magnesite mix may contain from about 0.9% to about 1.30% calcium oxide, 0.5% to about 3.30% silica, not more than 0.2% alumina, and not more than 0.6% iron oxide as impurities without detracting from the effectiveness of the additions of the refractory oxides.

It has been found that high purity magnesite basic refractory shapes containing at least 90% magnesia and fired at a temperature not less than 2800° F. have a creep rate of about $2.5 \times 10^{-5}$ inch/hour when subjected to a constant load of about 25 pounds per square inch at 2200° F. In an effort to decrease the creep rate of these shapes, enough titanium oxide was added to the basic refractory mix to amount to a 3% content in the fired shapes. The creep rate of the shapes under the same conditions mentioned above increased to $3.3 \times 10^{-5}$ inch/hour. Additions of manganese oxide to obtain a 3% content in the fired shapes also increased the creep rate to $3.1 \times 10^{-5}$ inch/hour.

A refractory oxide mix of 50% titanium oxide and 50% manganese oxide was then prepared. A sufficient quantity of this mix was added to the basic refractory mix to obtain a titanium oxide content of 0.5% and a manganese oxide content of 0.5% in the fired shape. The creep rate of the shape was found to be $2.8 \times 10^{-5}$ inch/hour. Another addition of the titanium oxide-manganese oxide mix was made to the basic refractory graded mix to obtain a 3.0% titanium oxide content and 3.0% manganese oxide content in the fired shape. The creep rate of the refractory shape was reduced to $1.16 \times 10^{-5}$ inch/hour.

The addition of a mix of 50% titanium oxide and 50% manganese oxide to the high purity magnesite refractory mix to produce a final mix containing from about .50% to about 5% titanium oxide and from about .50% to about 5% manganese oxide decreases the apparent porosity and increases the bulk density of the fired refractory shapes made therefrom. However the specific gravity remains substantially unchanged. Additions of manganese oxide alone had no apparent effect on the properties of the fired shape whereas additions of titanium oxide alone decreased the apparent porosity and increased the bulk density of the fired refractory shapes. However, additions of manganese oxide or titanium oxide alone do not decrease the creep rate of the basic refractory shapes.

The titanium oxide and manganese oxide mix added to the basic refractory mix in accordance with my invention may have a grain size such that substantially all the grains will pass a 325 mesh Tyler Sieve Size. The basic refractory graded mix may have a grain size such that substantially 50% of the grains pass a 100 mesh Tyler Sieve Size.

Microscopic examination of basic refractory shapes to which additions of the refractory oxides have been made shows that the titanium oxide precipitates in the grain boundaries while the manganese oxide diffuses through the grains of the magnesia.

By way of a specific example, a commercially prepared basic refractory batch having the following chemical composition: 94% MgO, .95% CaO, 2.5% $SiO_2$, 0.15% $Al_2O_3$, .05% FeO, the remainder incidental impurities and having the following screen analysis:

| Mesh size: | Percent retained |
|---|---|
| —6+100 | 50 |
| —100+325 | 40 | was mixed with 2% lignin binder and 2% water. A basic refractory oxide mix of 50% titanium oxide and 50% manganese oxide substantially all of which passed a 325 mesh Tyler Sieve Size was added to the refractory batch to obtain 1.5% $TiO_2$ and 1.5% $MnO_2$ content in the finished shape. A shape, 4" x 1½" x 1½", was pressed from the mix and then was fired at 200° F. per hour to 3150° F., soaked for 6 hours and cooled at a slow rate. The shape had an apparent porosity of 14.9, a bulk density of 220 pounds per cubic foot and an apparent specific gravity of 3.53.

The shape was then placed in a creep testing apparatus in which a constant load of 25 pounds per square inch was applied at a temperature of 2200° F. After 300 hours, at temperature, the creep rate was $1.6 \times 10^{-5}$ inch/hour.

The specimen was cooled down and again placed in the creep testing apparatus under constant load of 25 pounds per square inch and was fired at 2300° F. for 500 hours. No creep rate was observed.

Microscopic examination and electron probe analysis of the shape showed magnesium titanate and calcium titanate compounds in the grain boundaries and diffusion of $MnO_2$ within the grains of magnesia with substantially no silicate segregation in the base portion of the shape.

It should be understood, in the specification and claims, that wherever percentages are referred to, such percentages are by weight.

What is claimed is:

1. A fired basic refractory shape containing not less than about 90% magnesia, about 0.9% to about 1.3% calcium oxide, about 0.5% to about 3.3% silica, not more than about 0.2% alumina, not more than about 0.6% iron oxide and from about 0.5% to about 5.0% titanium oxide and about 0.5% to about 5.0% manganese oxide, the weight ratio of the amount of titanium oxide to the amount of manganese oxide being about 1:1 and having a microstructure containing magnesium titanates and calcium titanates in the grain boundaries and manganese oxide in the grains of magnesia.

2. The fired basic refractory shape of claim 1 in which the magnesia content is not less than 94%.

References Cited

UNITED STATES PATENTS

| 3,194,672 | 7/1965 | Davies et al. | 106—59 |
| 3,231,402 | 1/1966 | Leatham | 106—58 |
| 3,310,414 | 3/1967 | Alper et al. | 106—58 |
| 3,312,557 | 4/1967 | Havranek et al. | 106—58 |

JAMES E. POER, Primary Examiner